United States Patent Office 2,894,934
Patented July 14, 1959

2,894,934

SYNTHETIC RESIN AND INSULATED ELECTRICAL CONDUCTOR

Charles A. Burkhard, Alplaus, N.Y., assignor to General Electric Company, a corporation of New York No Drawing. Application April 13, 1956
Serial No. 578,148

15 Claims. (Cl. 260—75)

This invention relates to a synthetic polyester resin, its preparation, and to insulated electrical conductors coated therewith. More particularly, this invention is concerned with a polyester resin comprising the product of reaction obtained by heating an alkoxybenzene dicarboxylic acid, a dihydric alcohol, and a polyhydric alcohol containing at least three hydroxyl groups.

Heretofore, polyester resins have been prepared from polyhydric alcohols and aromatic dicarboxylic acids such as, for example, phthalic acid, isophthalic acid, terephthalic acid, etc. However, in the preparation of the resins, considerable difficulty has been encountered in conducting the esterification reaction because of the limited solubility of the aromatic dicarboxylic acids in the polyhydric alcohols. One attempt at solution of this problem is to employ a solvent for the reaction but the rates of reaction obtained even with solvents have been less than desired. This difficulty of reaction is particularly noted with isophthalic acid and terephthalic acid. When polyester resins have been prepared using phthalic, isophthalic or terephthalic acid as the polyfunctional acid, it has been found that the resulting polyester materials do not have as high a hydrolytic stability as desired.

I have discovered that the alkoxybenzene dicarboxylic acids are very compatible with and soluble in polyhydric alcohols such as glycols or higher polyols and that this increased compatibility or solubility permits the formation of resinous polyesters at a rapid rate without need for solvents for the reaction mixture. Furthermore, I have discovered that the resulting polyester resins exhibit hydrolytic stability superior to the hydrolytic stability of comparable materials formed from phthalic acid, isophthalic acid, or terephthalic acid. I have found further that the polyester resins of my invention may be applied to electrical conductors to form insulated electrical conductors suitable for use as magnet wires. In particular, I have found that those polyester resins prepared from alkoxyisophthalic or alkoxyterephthalic acids may be employed as magnet wire insulation at temperatures as high as at least 135° C. I have found further that those polyester resins prepared from alkoxyphthalic acid may be employed as magnet wires at class A operating temperatures which are up to about 105° C.

The polyester resins of my invention may be prepared by maintaining a mixture of an alkoxybenzene dicarboxylic acid, a dihydric alcohol, and a polyhydric alcohol at polyester resin forming conditions until the desired degree of esterification is obtained.

The alkoxybenzene dicarboxylic acids within the scope of the present invention consist of an aromatic nucleus containing two nuclear-bonded carboxyl groups and at least one nuclear-bonded alkoxy group. The length of the alkoxy group may vary from 1 to 10 or more carbon atoms and include, for example, methoxy, ethoxy, propoxy, isopropoxy, butoxy, etc. radicals. The preferred alkoxy group within the scope of my invention is the methoxy group. The number of methoxy groups attached to the aromatic nucleus may vary from 1 to 3, inclusive, and preferably is 1.

Thus, the alkoxybenzene dicarboxylic acids within the scope of the present invention may be described by the following formula:

(1) 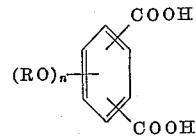

where R is an alkyl radical containing from 1 to 10 carbon atoms and $n$ is an integer equal to from 1 to 3, inclusive. The preferred type of alkoxybenzene dicarboxylic acid within the scope of the present invention is the monomethoxybenzene dicarboxylic acid which is described by the following formula:

(2) 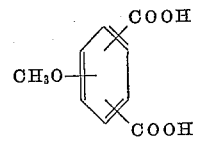

Typical alkoxybenzene dicarboxylic acids within the scope of Formula 1 or 2 include, for example, methoxyterephthalic acid, 2-methoxyisophthalic acid, 4-methoxyisophthalic acid, 5-methoxyisophthalic acid, 3-methoxyphthalic acid, 4-methoxyphthalic acid, 2,4-dimethoxyisophthalic acid, 4,6-dimethoxyisophthalic acid, n-butoxyterephthalic acid, 4-ethoxyisophthalic acid, 3-isopropoxyphthalic acid, etc.

The "dihydric alcohols" within the scope of the present invention include the glycols having the formula:

(3) $$HOC_aH_{2a}OH$$

where $a$ is an integer equal to from 2 to 10, inclusive. Included within the scope of Formula 3 are the polymethylene glycols, such as, for example, ethylene glycol, trimethylene glycol, tetramethylene glycol, etc., as well as branched-chain glycols such as propylene glycol, neopentyl glycol, etc. Other dihydric alcohols within the scope of the present invention include the ether alcohols, for example, diethylene glycol, triethylene glycol, dipropylene glycol, etc. The preferred dihydric alcohol of the present invention is ethylene glycol.

The polyhydric alcohols containing at least three hydroxyl groups which are used in the practice of the present invention include those polyhydric alcohols of the class described which are commonly employed in polyester resins. Typical polyhydric alcohols of this class include, for example, glycerol, pentaerythritol, 1,1,1-trimethylol ethane, 1,1,1-trimethylol propane, diglycerol, dipentaerythritol, sorbitol, etc. The preferred polyhydric alcohol employed in the practice of this invention is glycerol. For the sake of brevity the polyhydric alcohol containing at least three hydroxyl groups will be referred to hereinafter generically as a "polyhydric alcohol."

In carrying out the process of the present invention the alkoxybenzene dicarboxylic acid, the dihydric alcohol and the polyhydric alcohol are placed in any suitable reaction vessel and heated to the reaction temperature. The reaction mixture is then held at the reaction temperature until a sufficient degree of polyesterification has been obtained. The temperature at which the reaction may be carried out is not critical and may vary from temperatures as low as 50–75° C. up to temperatures as high as 250° C. However, I prefer to employ temperatures from about 190–210° C. At this latter temperature range, the rate of reaction is relatively reasonable and the temperature is still low enough to eliminate the need for complicated reaction equipment. Thus, at temperatures much above 190–210° C., it is sometimes found that some of the reactants tend to boil away from reaction mixture. In this case it is desirable to provide a suitable reflux condenser to return volatile material to the reaction mixture. When the reaction is carried out at temperatures below about 210° C., it is found that there is very little tendency for the reactants to escape from the system so that condensers are not needed. The reaction may be carried out in an open reaction vessel in contact with the atmosphere or the reaction may be carried out under an inert atmosphere such as, for example, a nitrogen atmosphere. However, satisfactory results are obtained without the use of special precautions as to atmosphere. As will be discussed in detail hereafter, the reaction of the present invention is sometimes carried out in the presence of an excess of the dihydric alcohol and the polyhydric alcohol. Since it is desirable to remove these alcoholic constituents from the final polymeric polyester, it is desirable to heat the reaction mixture to a temperature above the reaction temperature after reaction is substantially completed to distill the unreacted alcohols and other volatile materials from the reaction mixture. The temperature at which this "devolatilization" step takes place is not critical and I have found that satisfactory devolatilization is obtained by heating the reaction mixture after polyester formation at temperatures of from about 250–300° C. at atmospheric pressures or subatmospheric pressures as low as 1 mm. for times which vary from several minutes up to an hour or more. Since the reaction of the present invention is generally carried out in the absence of special solvents, the polyester resin is substantially pure after the devolatilization step and at this time the reaction mixture may be cooled to room temperature giving a hard, semi-transparent polyester resin. This hard resin may then be dissolved in a suitable solvent, ground up into powder, or mixed with other ingredients depending on the final use to which the polyester resin is to be put.

The proportions of the three ingredients in my polyester resin may vary within extremely wide limits. The only substantial limitation on the ratios of the various ingredients which form the resin is that the number of hydroxyl groups present should be at least equal to the number of carboxyl groups present. This is desirable since the reaction proceeds at a faster rate when at least one hydroxyl group is present per carboxyl group and also because the resulting product is not acidic to any degree when these conditions are met. Although no rigid limits for the ratios of ingredients exist, it has been found that especially desirable polyester resins are formed when the reaction mixture contains from about 1 to 6 hydroxyl groups per carboxyl group and when there are present from about 0.1 to 7.0 equivalents of the polyhydric alcohol per equivalent of the dihydric alcohol. The term "equivalent" as used in this specification in connection with the dihydric and polyhydric alcohols is used in its normal sense to mean the number of moles of the alcoholic material times the number of hydroxyl groups in each molecule of the alcoholic material. Thus, for example, one mole of ethylene glycol is equal to two equivalents of ethylene glycol and one mole of pentaerythritol is equal to four equivalents of pentaerythritol. In the preferred specific embodiment of my invention, which comprises a resin formed from a monomethoxybenzene dicarboxylic acid, ethylene glycol, and glycerol, I employ about two hydroxyl groups per carboxyl group and about 0.6 equivalent of glycerol per equivalent of ethylene glycol. However, as previously mentioned the fact that there is an excess of dihydric and polyhydric alcohols in this preferred reaction mixture results in the removal of unreacted excess alcoholic materials during the devolatilization process.

The time required to form the polyester resins of the present invention depends on the particular reactants employed and the proportions of these reactants and also on the temperature of the reaction. In general, the reaction proceeds to a satisfactory degree of polyesterification in times which vary from about 4 to 24 hours. When it is desired to speed up the reaction, the reaction may be effected in the presence of esterification catalysts. The esterification catalysts useful in the practice of this invention are those typical catalysts which have been used in the past for esterification. Among the many catalysts may be mentioned, for example, lead oxide, lead acetate, zinc oxide, cadmium acetate, cuprous acetate, zinc acetate, magnesium acetate, beryllium acetate, stannic acetate, ferric acetate, nickel acetate, etc. The amount of the catalyst employed is not critical and may vary over a wide range depending on the particular polyester system under consideration. In general, I employ from about 0.01 to 0.5 percent, by weight, of the esterification catalyst based on the weight of the alkoxybenzene dicarboxylic acid. Higher concentrations of the catalyst may be employed, but no advantage is gained by such use. Preferably I employ about 0.1 percent by weight of the metallic component of the catalyst based on the total weight of the dibasic acid. When these esterification catalysts are employed they materially shorten the required reaction time so that the reaction of the present invention proceeds in times as low as 45 minutes but may take as long as 3–5 hours with catalysts. It should be understood that although the catalysts do accelerate their reaction their use is not required.

Although the reaction of the present invention has been described as being carried out in the absence of solvents, it should be understood that solvents may be used if desired. Thus, the reaction may be carried out in the presence of any solvent which is inert under the conditions of the reaction. Satisfactory solvents for the reaction include the various isomeric xylenes, toluene, as well as petroleum hydrocarbon fractions boiling at temperatures above about 250° C. However, it should be understood that no particular advantage is gained by employing solvents during the course of the reaction.

The following examples are illustrative of the practice of my invention and are not intended for purposes of limitation. All parts are by weight.

*Example 1*

5-methoxyisophthalic acid was prepared by adding dropwise with stirring at 80° C., 75 parts of dimethylsulfate to a mixture of 122 parts of 3,5-dimethylphenol and 45 parts of sodium hydroxide dissolved in 500 parts of water. After heating this mixture for 4 hours the resulting organic layer was separated from the aqueous layer and distillation of the organic layer yielded 3,5-dimethylanisole which boiled at 112° C. at 46 mm. and had a refractive index $n_D^{20}$ 1.5119. A solution of 158 parts of potassium permanganate and 20 parts of 10 percent sodium hydroxide in 3500 parts of water was heated to 80° C. Then 64 parts of the 3,5-dimethylanisole was added dropwise with stirring. At this time a second addition of 158 parts of potassium permanganate was made. After heating the reaction mixture for an additional 8 hours at 80° C. the magnesium dioxide which precipitated was separated by filtration. Acidification of the filtrate with cold dilute sulfuric acid yielded 5-methoxyisophthalic acid which had a melting point of 274–275° C. Analysis of this material showed the presence of 55.4 percent by weight of carbon and 4.0 percent by weight of hydrogen with the neutral equivalent of 97. This is compared to the theoretical values of 55.11 percent carbon, 4.11 percent hydrogen and a neutral equivalent of 98. A mixture of 5-methoxyisophthalic acid, ethylene glycol and glycerol was formed in which there were present 2.81 hydroxyl groups per carboxyl group and in which there were 0.57 equivalent of glycerol present per equivalent of ethylene glycol. This mixture was heated at 210° C. for 24 hours, after which time the resin was further heated at 230° C. at 1 mm. to remove any unreacted ethylene glycol or glycerine as well as other volatile products. When the devolatilized material was cooled to room temperature a hard, transparent resin was formed.

*Example 2*

4-methoxyisophthalic acid was prepared by the general procedure of Example 1 except that 2,4-dimethylanisole was prepared from 2,4-dimethylphenol and the 2,4-dimethylanisole was then oxidized to 4-methoxyisophthalic acid. A mixture was then formed of 4-methoxyisophthalic acid, ethylene glycol, and glycerol with 2.81 hydroxyl groups being present per carboxyl group and with 0.57 equivalent of glycerol present per equivalent of ethylene glycol. This mixture was heated for 24 hours at 210° C. to form a polymeric polyester resin and the resulting mixture was heated at 230° C. at 1 mm. to remove excess ethylene glycol and glycerol and other volatile products. After this devolatilization the resulting material was cooled to room temperature to form a hard, semi-transparent resin.

*Example 3*

Following the procedure of Example 1, 3,4-dimethylanisole was formed from 3,4-dimethylphenol and the 3,4-dimethylanisole was oxidized to 4-methoxyphthalic acid. A mixture was prepared of 4-methoxyphthalic acid, ethylene glycol and glycerine in which there were 3.84 hydroxyl radicals per carboxyl radical and in which there were 1.14 equivalents of glycerol per equivalent of ethylene glycol. This mixture was heated 24 hours at 200° C., at which time unreacted ethylene glycol and glycerol and other volatile products were removed by heating the resin at 200° C. at 1 mm. for 4 hours.

*Example 4*

To illustrate the difference between the solubility, compatability, and reactivity of the alkoxybenzene dicarboxylic acids of the present invention and the benzene dicarboxacids of the prior art, a mixture was formed of terephthalic acid, ethylene glycol, and glycerol in which there were present 4.09 hydroxyl groups per carboxyl group and 0.142 equivalent of glycerol per equivalent of ethylene glycol. This mixture was heated for several hours at 200–210° C. without any appreciable solution of the powdered terephthalic acid in the reaction mixture. After continuing the heating at the same temperature for a total of 15 hours the terephthalic acid had still not completely dissolved. This is compared with the reaction mixtures described above and in Examples 5 and 6, which follow, in which the alkoxybenzene dicarboxylic acid went into solution during the first 10–20 minutes of the reaction and in which the reaction had proceeded almost to completion at the end of 15 hours.

As previously mentioned the polyester resins of the present invention are particularly useful as insulation for electrical conductors, particularly those insulated electrical conductors which are to be employed as magnet wires in dynamoelectric machines. When employing these polyester resins as wire insulation, the resins may be applied to the surface of the conductor or wire by conventional methods. Thus, in the usual method of applying these resins to conductors, the resins are dissolved in a suitable solvent and the conductor is dipped into or passed through the resin solution with the coated conductor being baked after each dip or pass through the solution. Among the many solvents suitable in this wire coating process may be mentioned, the various cresols, xylenols, polyhydroxy-benzenes, xylene and other polyalkyl benzenes, high boiling petroleum hydrocarbons, etc. After the conductor is passed through the solution of the resin the baking of the coated conductor has two effects. The primary effect, of course, is to remove the solvent from the resin leaving the substantially pure resin on the surface of the conductor. A secondary effect observed in the baking operation is that the high temperatures generally employed in the baking tend to further polymerize and cross link the resin to render it insoluble in ordinary solvents and also to increase its thermal stability. The resin solutions employed in this coating operation may vary in concentration over a very wide range. However, we have obtained satisfactory results employing solutions having a resin solids content of about 25–50 percent by weight of resin based on the weight of the solution. The temperature of the bake may also vary within fairly wide limits, with the time required for the bake depending on the temperature. I have found suitable baking temperatures to be about 275–350° C. With these baking temperatures the time required for baking may vary from a few seconds up to several minutes or more. I have found further that the time required for baking the resins may be decreased markedly by incorporating a suitable esterification catalyst into the resin solution. The suitable catalysts include those catalysts listed above in connection with the formation of the resin. The amount of catalyst employed in this baking operation may vary within wide limits, for example, from 0.001 to 0.01 part by weight of catalyst per part of resin. The amount of resin build obtainable on the conductors varies with the resin solids content of the coating solution as well as on the number of passes the conductor makes through the resin solution. Thus, coatings which vary in thickness from 0.5 to 5 mils may be obtained employing resin solids contents of about 25–50 percent in the solution and employing from 1–6 passes of the conductor through the solution.

The resulting insulated electrical conductors formed from the polyester resins of the present invention are unusual in that they exhibit a very high degree of resistance to attack by water as well as attack by organic solvents. In addition, the insulation films are very flexible while at the same time being resistant to abrasion. Furthermore, the insulation on the conductors exhibit a very high dielectric strength, varying from about 1500–3500 volts per mil. The thermal properties of the polyester resins of this invention depend on the particular alkoxybenzene dicarboxylic acid employed. Thus, where the acid employed is an alkoxy derivative of isophthalic or terephthalic acid, the resulting polyester resin exhibits unusual thermal stability in that the insulation on the conductors does not tend to soften to an appreciable extent until temperatures of 175–180° C. are reached. Furthermore, resins from derivatives of these two acids are extremely resistant to thermal degradation at temperatures of 135° C. and higher. And at these elevated temperatures resins formed from derivatives of these two acids retain their mechanical and electrical properties as well as their solvent resistance. For these reasons, magnet wires formed from derivatives of these two acids are found to be eminently suitable for use as magnet wires at temperatures of 135° C. and higher.

The polyester resins prepared from alkoxy derivatives of phthalic acid do not exhibit the extremely good thermal properties of the other polyester resins because of the tendency for the phthalic acids to form anhydrides at elevated temperatures. However, polyester resins formed from alkoxy derivatives of phthalic acid are completely suitable for use at temperatures as high as 105° C. At this temperature these resins retain their flexibility, abrasion resistance, and electrical properties while exhibiting no tendency to degrade. Therefore, conductors coated with polyester resins of the class described formed from alkoxy-phthalic acid derivatives are suitable as magnet wire insulation in class A applications which do not involve temperatures greater than about 105° C.

The following two examples illustrate the preparation of insulated electrical conductors within the scope of the present invention.

*Example 5*

A mixture of 4-methoxyisophthalic acid, ethylene glycol and glycerol was prepared in which there were 4.00 hydroxyl groups per carboxyl groups and 0.142 equivalent of glycerol per equivalent of ethylene glycol. This reaction mixture was heated at 210° C. for 9 hours. During the initial 15 minutes of this 9 hour period all of the 4-methoxyisophthalic acid went into solution. At the end of the heating period the reaction mixture was cooled to yield a hard, non-tacky pale yellow clear resin. This resin was then heated for 30 minutes at 205° C. at 1 mm. to remove the unreacted ethylene glycol and glycerol and other volatile materials. The softening point of this resin was found to be about 65–67° C. A 33.33 percent solids solution of this resin was prepared by dissolving 1 part of the resin in 2 parts of USP cresol at 190° C. After this cresol solution cooled to room temperature a number of 41 mil diameter round copper wires were dipped into the solution. The wires were then removed from the solution, allowed to drain and heated for 5 minutes at 250° C. to remove the solvent and bake the enamel. Each of the wires was then dipped four additional times following the same procedure. After the last dip the wires were baked for an additional 15 minutes at 290° C., yielding insulated electrical conductors having a build of about 3 mils of resin (a 6 mil total increase in the diameter of the conductor) which were smooth and had a brownish-tan color. These wires could be bent about their own diameter without cracking the enamel. In addition to the flexibility of the wire demonstrated above, the wire was also extremely abrasion resistant, had a dielectric strength of over 1500 volts per mil, was insoluble in a toluene-alcohol mixture at 100° C., exhibited no softening at 180° C., and showed no thermal degradation when maintained at a temperature of 135° C.

This 33.3 percent solution of the 4-methoxyisophthalate resin was also applied to aluminum wire. A 36 mil aluminum wire was cleaned in a warm aqueous solution of trisodium phosphate, rinsed in distilled water and dried. The wire was given four coats of enamel by dipping the wire in the cresol solution which had been modified by adding ½ percent by weight of zinc based on the weight of the resin as zinc octoate. After applying four coats of enamel with a bake between each coat the resulting insulated aluminum conductor had a light colored, tough, flexible film thereon. This same catalyzed resin solution was also applied to 32 mil diameter silver wire.

*Example 6*

Following the general procedure of Example 1, 2,5-dimethylanisole was prepared from 2,5-dimethylphenol. The 2,5-dimethylanisole was then converted to methoxyterephthalic acid. A polyester resin was then prepared by forming a mixture of methoxyterephthalic acid, ethylene glycol, and 1,1,1-trimethylol ethane in which there were 4.09 hydroxyl groups presents per carboxyl group and in which there was 0.142 equivalent of the trimethylol ethane per equivalent of ethylene glycol. This mixture was heated at a temperature of 200–210° C. for 8 hours. During the initial 20 minutes of heating the methoxyterephthalic acid went into solution. At the end of this 8 hour period the resin was cooled, yielding a light brown, sticky, viscous material. This viscous material was then heated for about 30 minutes at 205° C. at 1 mm. to remove any unreacted ethylene glycol and trimethylol ethane as well as other volatile products. The final product on cooling was a slightly tacky, clear resin. A 33.33 percent by weight solution of this resin was prepared by dissolving 1 part of the resin in 2 parts of USP cresol. This resin solution was then applied to 41 mil diameter round copper wire by the same procedure followed in Example 5 and the resulting wire enamel had properties comparable to that of the resin of Example 5. To a portion of the resin solution just described, was added ½ percent by weight based on the weight of the resin of zinc octoate to act as a catalyst. Forty-one mil diameter round copper wire was then coated and baked as described above. The insulated electrical conductors prepared from the catalyzed resin solution were somewhat lighter in color than those prepared without catalyst. The properties of the insulation on the wires prepared with the catalyst compared favorably with those prepared without catalyst. Thus, the wires did not exhibit any cracking or crazing when bent about their own diameter and examined under 14× magnification. Furthermore, the wires exhibited no swelling when immersed in xylene for 12 days at room temperature. The adhesion of these enamels to the copper substrate was excellent as evidenced by the fact that the enamels were difficult to scrape off the surface even with a sharp penknife. Another portion of the catalyzed solution just described was applied to 36 mil round aluminum wire by the same procedure just described. This resulted in an insulated electrical conductor having a light colored surface which exhibited good flexibility in that it did not crack when bent around its own diameter.

Although the foregoing examples have described only some of the polyester resins within the scope of the present invention it should be understood that all of the resins within the scope of this invention may be prepared by the methods illustrated above. Furthermore, each of these resins may be applied to an electrical conductor by the method previously described.

In addition to employing the polyester resins of the present invention as insulation for electrical conductors, these resins may also be applied as surface coatings on wood, metal panels and the like. Thus, the zinc octoate containing cresol solution of the 4-methoxyisophthalate resin described in Example 5 was applied over a smooth panel of cold-rolled steel. The resulting coated panel was baked for one-half hour at about 140° C. and then for one-quarter hour at 275° C. The resulting film was smooth, glossy and quite hard. It could not be marred with the fingernail and the adhesion of the film to the steel panel was excellent. This same resin was also applied to a tin-plated steel panel and baked in the same manner as was done with the steel surface and the resulting baked coating was uneffected by immersion for one hour in acetic acid at 70–80° C.

In another surface coating application, the zinc octoate catalyzed cresol solution of methoxyterephthalic acid which was described in Example 6 was applied to 1 mil aluminum foil. This coated foil was then baked for 30 minutes at 140° C. and then for 15 minutes at 270° C. The resulting coating was clear, pale yellow, flexible, and very adherent. The film was insoluble in both xylene and ethyl acetate.

In addition to using the resins of the present invention as coating materials, these resins may also be used as adhesives. Thus, the catalyzed cresol solution of Example 6 was placed between two glass plates which were held together with spring clamps. This assembly was heated for 1 hour at 275° C. When the assembly was cooled to room temperature the two pieces of glass were firmly bonded together and could not be pried apart without breaking the glass.

Although the foregoing examples have shown only one alkoxybenzene dicarboxylic acid, ethylene glycol, and one polyhydric alcohol in each resin, it should be understood that more than one of the acids or polyhydric alcohols may be employed in a given formulation. In addition, other dihydric alcohols than ethylene glycol may be employed and mixtures of such dihydric alcohols may be employed. Furthermore, these resins may be modified by the addition of minor amounts of other synthetic resins which can act as extenders for cross-linking agents. Among the modifying resins which may be employed are included, for example, silicone resins, melamine formaldehyde resins, epoxide resins such as the reaction product of epichlorohydrin and bis-phenol-A, phenol formaldehyde resins, aniline formaldehyde resins, urea formaldehyde resins, cellulose acetate resins, polyamide resins, vinyl resins, ethylene resins, styrene resins, etc. When these modifying resins are employed they are mixed with the polyester resins of this invention and the mixture is used in any desired application.

The resins of the present invention may also be modified by substituting a fatty acid or a mixture of fatty acids for some or all of the dihydric alcohols. However, in making such modifications it should be understood that the modified reaction mixture should contain at least one hydroxyl group per carboxyl group including the carboxyl groups from the monobasic acids. The preferred upper ratio of hydroxyl groups to carboxyl groups remains at its original value of about 6. When these resins are modified by the substitution of fatty acids for some or all of the dihydric alcohol, the total number of moles of fatty acid present should not exceed the number of moles of alkoxybenzene dicarboxylic acid in the resin formulation.

The following example illustrates the preparation of an alpihatic acid modified polyester resin composition of the type described.

Example 7

A mixture was formed of 4-methoxyisophthalic acid, glycerol and soya fatty acids in the ratio of 1.02 moles of 4-methoxyisophthalic acid, 1.06 moles of glycerol and 0.71 mole of soya fatty acids. This reaction mixture contained 1.16 hydroxyl groups per carboxy group and has an oil length of about 40 percent. This reaction mixture was heated for about 5½ hours at 205–215° C. during which time the reaction mixture thickened considerably. Upon cooling the resin was a tack-free, pale yellow, non-brittle, soft material which melted below 100° C. to form a thin syrup. Its cure time at 190° C. was found to be 42 seconds. The uncured resin was soluble in ethyl acetate, in benzene, or in a mixture of 1 part of xylene and 1 part of methyl ethyl ketone. A film of this resin was placed on a glass plate by heating the resin until it was a liquid and then flowing it over the plate. When cooled, the resin formed a glossy, nearly colorless film. When the film was examined after three weeks it was found to be insoluble in boiling ethyl acetate indicating that an air cure had taken place. A second film of the resin was prepared on a glass plate and baked for 100 minutes at 200° C. The resulting film was found to have a yellow tinge and adhere tenaciously to the glass base. This film was insoluble in boiling ethyl acetate and did not fuse at 200° C. Similar films of this resin were applied in the same manner to aluminum foil, steel panel, and copper panel. A varnish solution was prepared from this resin using the following formulation: 50 parts of the resin, 0.7 part of cobalt octoate, 1.6 parts of lead naphthenate, 25 parts of xylene and 25 parts of methyl ethyl ketone. A film of this varnish was applied to a glass surface and was found to be tack-free at the end of about 6 hours at room temperature. When a similar film was baked for 1 hour at 133° C. the film was very hard and was found to be insoluble in ethyl acetate. A pigmented coating composition was prepared from this varnish by adding 1 part of powdered titanium dioxide (paint grade) to 2.155 parts of the varnish. This mixture was stirred well and applied to a glass slide. After about 5 minutes at room temperature this white coating was virtually tack-free. Three weeks later the white coating was found to be insoluble in ethyl acetate.

Although Example 7 describes the use of only a single type of fatty acid in the modified polyester resin of my invention, it should be understood that other fatty acids may be employed. Among these fatty oils are included, for example, the non-drying, semi-drying and drying fatty acids including the vegetable oil fatty acids and animal oil fatty acids such as soya, cottonseed, hydrogenated cottonseed, linseed, castor, hydrogenated castor, dehydrated castor, cocoanut, tung, oiticica, menhaden, hempseed, rapeseed, corn, codliver, candlenut, walnut, perilla, poppyseed, safflower, conjugated safflower, sunflower, chinawood, tristearin, whale, sardine, herring, etc. fatty acids.

What I claim as new and desire to secure by Letters Patent of the United States is:

1. A polyester resin prepared by heating at a temperature of about 50 to 250° C. a mixture of ingredients consisting of an alkoxybenzene dicarboxylic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

2. A polyester resin prepared by heating at a temperature of about 50 to 250° C. a mixture of ingredients consisting of a monomethoxybenzene dicarboxylic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

3. A polyester resin prepared by heating at a temperature of about 50 to 250° C. a mixture of ingredients consisting of a methoxyisophthalic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

4. The polyester resin of claim 3 in which the methoxyisophthalic acid is 4-methoxyisophthalic acid.

5. The polyester resin of claim 3 in which the methoxyisophthalic acid is 5-methoxyisophthalic acid.

6. A polyester resin prepared by heating at a temperature of about 50 to 250° C. a mixture of ingredients consisting of methoxyterephthalic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

7. A polyester resin prepared by heating at a temperature of about 50 to 250° C. a mixture of ingredients consisting of a methoxyphthalic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

8. The polyester resin of claim 7 in which the methoxyphthalic acid is 4-methoxyphthalic acid.

9. A polyester resin prepared by heating at a temperature of about 50 to 250° C. a mixture of ingredients consisting of 4-methoxyisophthalic acid, ethylene glycol, and glycerol, the proportions of ingredients being selected to provide from 1 to 6 hydroxyl groups per carboxyl group and from 0.1 to 7.0 equivalents of glycerol per equivalent of ethylene glycol.

10. An insulated electrical conductor comprising the combination of an electrical conductor and a coating which comprises the product prepared by heating at a temperature of about 50 to 250° C. a mixture of ingredients consisting of an alkoxybenzene dicarboxylic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

11. An insulated electrical conductor comprising, in combination, an electrical conductor coated with a polyester resin prepared by heating at a temperature of about 50 to 250° C. a mixture of ingredients consisting of a monomethoxybenzene dicarboxylic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

12. An insulated electrical conductor comprising, in combination, an electrical conductor coated with a polyester prepared by heating at a temperature of about 50 to 250° C. a mixture of ingredients consisting of a methoxyisophthalic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

13. The insulated electrical conductor of claim 12 in which the methoxyisophthalic acid is 4-methoxyisophthalic acid.

14. An insulated electrical conductor comprising, in combination, an electrical conductor coated with a polyester resin prepared by heating at a temperature of about 50 to 250° C. a mixture of ingredients consisting of methoxyterephthalic acid, a dihydric alcohol, and a polyhydric alcohol containing at least three hydroxyl groups, the proportions of ingredients being selected to provide from 1 to 6 hydroxyl groups per carboxyl group and from 0.1 to 7.0 equivalents of polyhydric alcohol per equivalent of dihydric alcohol.

15. An insulated electrical conductor comprising, in combination, an electrical conductor coated with a polyester resin prepared by heating at a temperature of about 50 to 250° C. a mixture of ingredients consisting of 4-methoxyisophthalic acid, ethylene glycol and glycerol, the proportions of ingredients being selected to provide from 1 to 6 hydroxyl groups per carboxyl group and from 0.1 to 7.0 equivalents of glycerol per equivalent of ethylene glycol.

References Cited in the file of this patent

UNITED STATES PATENTS

| | | |
|---|---|---|
| 2,470,651 | Schaffel | May 17, 1949 |
| 2,744,078 | Caldwell et al. | May 1, 1956 |
| 2,753,373 | Hutchings et al. | July 3, 1956 |

FOREIGN PATENTS

| | | |
|---|---|---|
| 634,960 | Great Britain | Mar. 29, 1950 |